March 10, 1964
C. N. WILLIAMS
3,123,935
TRAY MEANS AND MAGNETICALLY COOPERABLY
RETAINABLE ARTICLE MEANS
Filed Nov. 5, 1962
3 Sheets-Sheet 1
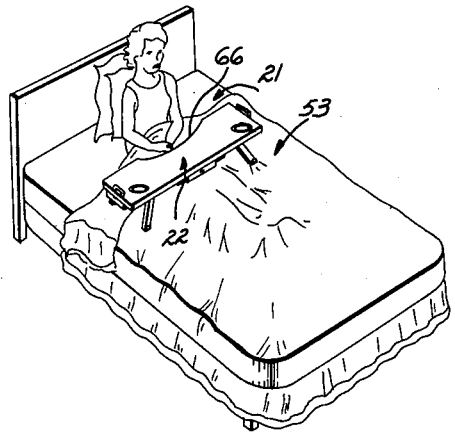
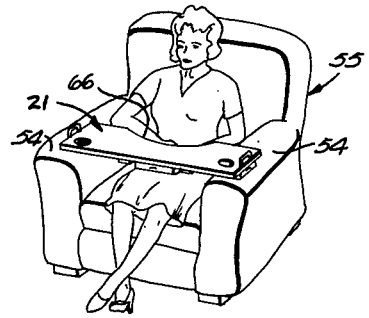
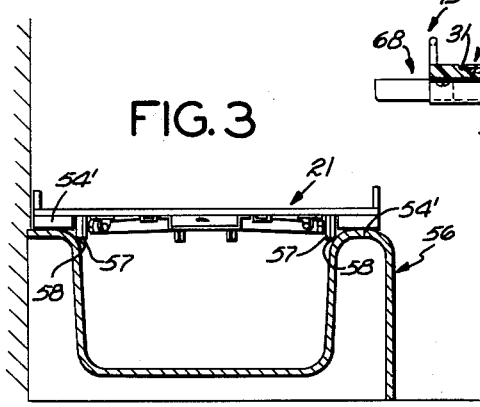
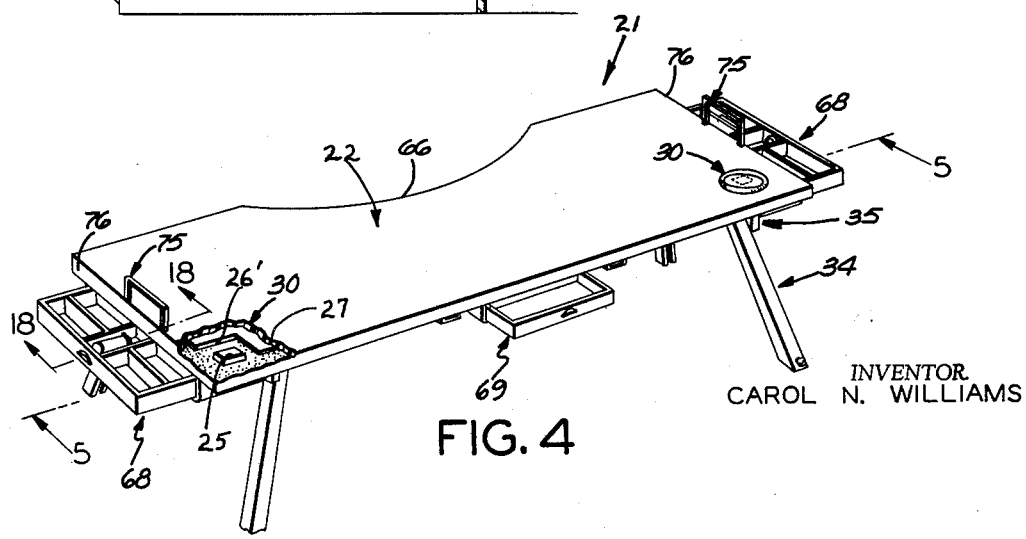
INVENTOR.
CAROL N. WILLIAMS

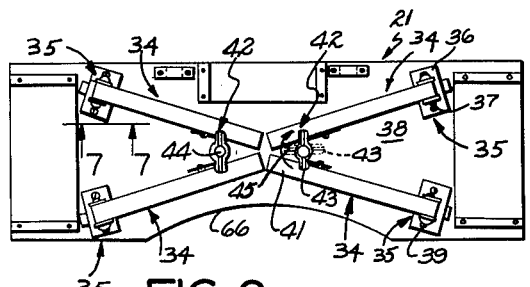
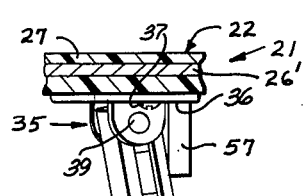
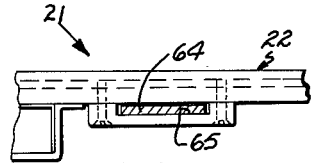
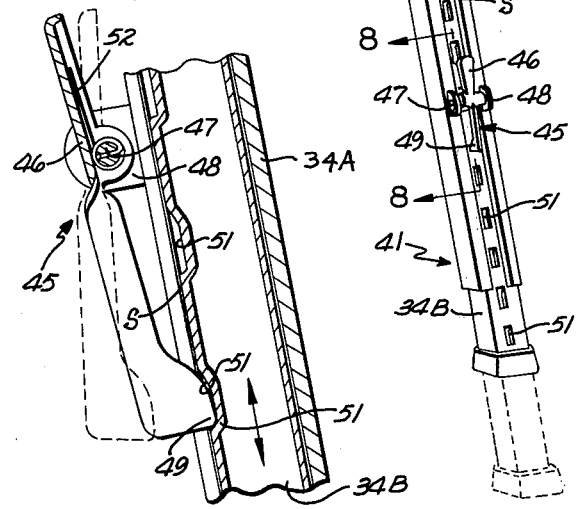
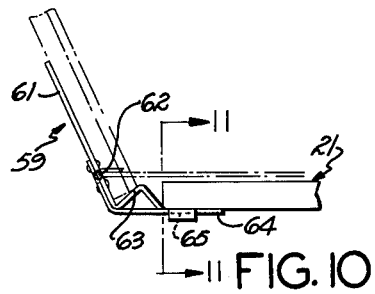
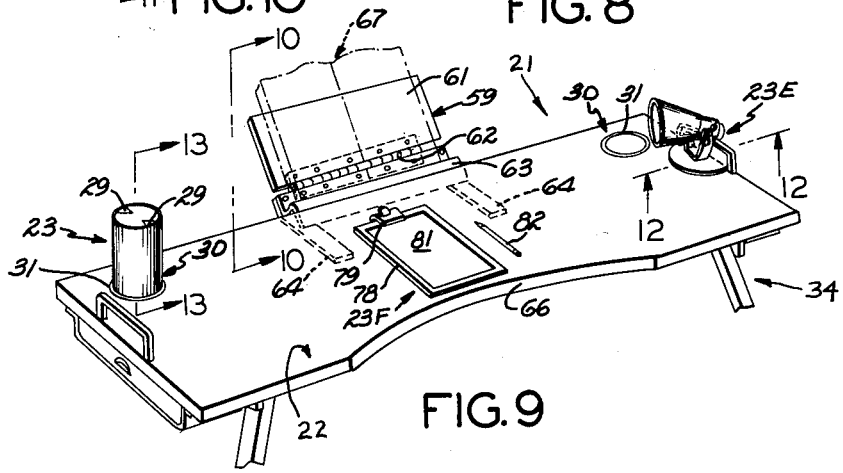
INVENTOR.
CAROL N. WILLIAMS

INVENTOR.
CAROL N. WILLIAMS

United States Patent Office 3,123,935
Patented Mar. 10, 1964

3,123,935
TRAY MEANS AND MAGNETICALLY COOPER-
ABLY RETAINABLE ARTICLE MEANS
Carol N. Williams, 305 W. 8th St., Los Angeles 14, Calif.
Filed Nov. 5, 1962, Ser. No. 235,323
13 Claims. (Cl. 45—85)

Generally speaking, the present invention relates to a platform and/or tray means and article means, which may comprise a single article or a plurality of articles of any of a variety of different types, adapted to be positioned on the platform or tray means and to there be retained. More particularly, the invention pertains to apparatus of the character broadly referred to in the preceding sentence wherein the article means is or are adapted to be magnetically cooperably and firmly retained with respect to the platform or tray means on an upper surface thereof with sufficient magnetic attractive retaining force existing between the platform or tray means and the article means to virtually eliminate the possibility of accidental and inadvertent dislodgement of the article means from said upstanding relationship on said platform or tray means and yet to allow ready removal of said article means from the platform or tray means when a relatively slight amount of force is manually applied to the article means in order to remove it from the tray means intentionally.

It should be noted that in one preferred form of the invention the article means broadly referred to above may include, but not be specifically limited to, one or more receptacles adapted to receive, contain, and/or carry various materials therein such as ingestible materials like food, drink, or the like, or waste materials such as cigarette ashes, or the like. In other words, in certain forms of the invention, certain of said articles may comprise dishes, glasses, cups, bottles, or the like, carrying either solid or liquid food, drink, soup, or the like, and, in certain cases, at least one of said articles may comprise an ash tray or the like.

It should be clearly noted that the articles described above are merely illustrative of the invention but are not to be construed as limiting the invention specifically to only the articles particularly mentioned above. Actually, the invention may comprise a variety of types of articles adapted to be magnetically retained on a tray means, or any platform or surface means, in a manner allowing ready manual movement and/or removal thereof and yet in a manner preventing accidental or inadvertent dislodgment of the articles with respect to the surface of the platform or tray means.

The above-mentioned prevention-of-dislodgement feature of the present invention provides an arrangement which is particularly useful wherever the likelihood of such accidental or inadvertent dislodgement of one or more articles with respect to the surface of a platform or tray means is substantial, such as in the case of a bed tray where the tray normally overlies a portion of a person's body and is quite likely to be tipped over or jarred during movements of a person's body, and such as in the case of any of various moving vehicles, such as motor vehicles (including private automobiles, buses, and the like), trains, and/or other non-stationary structures which would normally tend to vibrate or jar a tray or a table to a degree such as to greatly increase the chances of the inadvertent tipping over of one or more of various articles resting thereon. This is substantially completely prevented by the novel arrangement of the present invention.

The magnetic cooperation of the article means and the platform or tray means is provided by two-element magnetic retaining means comprising first and second magnetic means which are magnetically attractively cooperable with respect to each other, one element of said two-element magnetic retaining means being effectively carried by said platform or tray means adjacent to an upper surface thereof and the other element of said two-element magnetic retaining means being carried by any given one of said article means adjacent to the bottom thereof for magnetic attractive cooperation with respect to said first element of said magnetic retaining means carried by said platform or tray means.

In other words, each of said article means carries one element and said tray means carries the other element of said magnetic retaining means. It should be noted that, in this sense, each element of said magnetic retaining means carried by said article means, even though said article means may consist of a plurality of individual articles, effectively comprises said second-mentioned element of the corresponding two-element magnetic retaining means. However, it should be noted that the relating positions of first and second elements of the magnetic retaining means with respect to the engagement of any particular article means relative to said platform or tray means may be effectively interchanged from that of any other article means relative to said platform or tray means in certain forms of the invention, as will be described in greater detail hereinafter.

It should be noted that, in one preferred form of the invention, each two-element magnetic retaining means portion is effectively provided with non-magnetic thin-sheet spacer means which acts, in certain forms of the invention, to protect the surface of the platform or tray means from accidental scratching or marring same, but which is primarily intended to prevent the direct contact of the first and second mentioned elements of the magnetic retaining means effectively magnetically holding each article means with respect to said platform or tray means so as to make it possible to lift or move an article without having to overcome the extremely short range excessive magnetic attractive force which would normally result if direct engagement of said first and second elements of said magnetic retaining means occurred. In other words, the non-linear nature of magnetic attractive force is such that when direct contact of two permanent magnets occurs, or direct contact of a permanent magnet and a body of ferromagnetic material occurs, the initial force required just to separate the surfaces of the two elements is very much greater than the subsequent force required to move them farther apart.

This initial very short range contact-separation force would be so excessive as to make it likely that a container, such as a glass, cup, or the like, carrying liquid therein might be jostled in an attempt to remove it from the surface of the platform or tray, if the magnetic elements were in such direct contact, to an extent such as to possibly cause spilling of any liquid carried within said container.

However, the provision of a thin-sheet non-magnetic spacer between the two elements of the magnetic retaining means eliminates the excessive peak of such contact-attractive force and allows the easy removal of such a liquid-containing receptacle or container from the platform or tray means in a manner which is not at all likely to cause the liquid to be spilled.

It should also be noted that, in certain forms of the invention, the first element of the magnetic retaining means may comprise a thin sheet of ferromagnetic material coextensive with a very substantial area of the upper surface of said platform or tray means, while said second element of said magnetic retaining means, insofar as any given article means is concerned, comprises a polarized permanent magnet means carried by the base portion of said article.

However, it should also be noted that, in another variant form of said invention, said first element of said magnetic retaining means, insofar as any given article is concerned, may comprise a polarized permanent magnet carried by said platform or tray means underneath a selected portion of the top surface thereof, while said second element of said magnetic retaining means, insofar as the corresponding article is concerned, may comprise a quantity of ferromagnetic material carried by said article adjacent to the base thereof.

It should also be noted that, in certain forms of the invention, both of the variant arrangements of first and second elements of the magnetic retaining means, as referred to above in the two preceding objects, may be employed in combination. That is, certain portions of the upper surface of the platform or tray means may carry a thin sheet of ferromagnetic material adjacent to the top surface thereof for cooperation with permanent magnet means carried by one or more of the articles, while one or more other areas of the top surface of said platform or tray means may carry permanent magnet means thereunder for cooperation with corresponding ferromagnetic means carried by base portions of corresponding different ones of said articles.

In certain versions of the invention, the platform or tray means may be provided with leg means, and/or hinge means hingedly mounting said leg means with respect to said tray means for upward folding movement into a position lying immediately under said tray means and for controllable downward movement into extended relationship for engagement with an underlying supporting surface, whereby to support the tray means thereabove—usually in a substantially horizontal plane.

It should also be noted that, in certain forms of the invention including the tray means provided with leg means and/or hinge means as referred to above, said leg means may be provided with controllably extendable portions and means for locking them in various extended relationships, in certain forms thereof. Also, in certain versions of this form of the invention, retaining means may be provided and positioned for controllable cooperation with the leg means for retaining said leg means in said upwardly folded relationship when desired.

It should be noted that, in one preferred form of the invention, the tray means may be provided with one or more end- and/or edge-mounted drawer means lying below said top surface of said tray means and being mounted for controllable outward extension into open relationship and for controllable inward retraction into closed relationship with respect to said tray means.

It should also be noted that, in one specific version of the invention, the tray means may be provided at a substantially central location remote from an edge of said tray means adapted to be positioned immediately in front of the torso of a user of the tray with controllably mountable and dismountable book rest means adapted to receive and carry thereon book means, which is intended to mean conventional hard bound books, paper bound books, magazines, and the like. In certain specific forms of this version of the invention, the book rest means may be provided wtih hinge means at substantially the same level as the top surface of the tray means whereby to allow the book rest means to be folded downwardly into virtual contact with the top surface of the tray means for ready portability and/or storage when desired.

In one specific version of the invention, the tray means may be provided with handle means mounted in upstanding relationship substantially flush with end edges of said tray means whereby to provide a firm end support for said tray means when standing on end during non-use periods.

In one specific form of the invention the bottom surface of the tray means may include downwardly projecting positioning means adapted to effectively cooperate with inner side edges of a bathtub whereby to properly position said tray means across the open upper top portion of a bathtub between side portions thereof, and/or to similarly cooperate with inner top portions of the arms of a chair whereby to properly position said tray means across and spaced above the seat of said chair.

With the above points in mind, it is an object of the present invention to provide a novel platform and/or tray means and magnetically cooperably retainable article means, in accordance with the broad generic definition thereof set forth hereinbefore, and/or in accordance with any or all of the various specific aspects thereof referred to hereinbefore and which is of relatively simple, inexpensive, easy-to-manufacture, and easy to-use construction such as to be conducive to widespread use thereof.

Further objects are implicit in the detailed description which follows hereinafter (which is to be construed as exemplary of the invention but not specifically limiting it) and said objects will be apparent to persons skilled in the art after a careful study of the detailed description which follows hereinafter.

For the purpose of clarifying the nature of the present invention, one exemplary embodiment (including several variant forms of magnetic retaining means for different articles) is illustrated in the hereinbelow described figures of the accomapnying three sheets of drawings and is described in detail hereinafter.

FIG. 1 is a perspective view, drawn to a very small scale, illustrating one exemplary form of the present invention wherein it is shown as comprising a tray means having controllably erectable and collapsible downwardly directed leg means (shown in erected relationship in this view) for mounting the entire device over the lap of a person sitting up in bed. In other words, it is shown in a position suitable for use as a tray adapted to support food and drink receptacles and the like, in front of the person.

FIG. 2 is another perspective view illustrating the tray of FIG. 1 with the legs in the effectively collapsed relationship so as to allow the laterally positioned end portions of the tray to rest on the arms of the chair whereby to properly position the tray for use by the person sitting in the chair.

FIG. 3 is an elevational view of the tray with the legs effectively collapsed in the same manner as FIG. 2 but showing the tray mounted on, and cooperating with, lateral side edge portions of a bathtub. This view clearly shows the downwardly projecting positioning elements which properly position the tray with respect to the bathtub by contact with inner surfaces of the top edges of the side portions of said bathtub (and which may function similarly in FIG. 2).

FIG. 4 is a larger-scale perspective view of the tray in the same general orientation as shown in FIG. 1—that is, with the view being taken from an angular position above and laterally offset from one end of the tray and with the legs being in the controllably erected downwardly directed relationship. However, this view differs from FIG. 1 in that the end- and edge-mounted drawers are shown in extended relationship and in that the top surface of the near corner of the tray is shown partially broken away in order to clarify the mounting of the two different types of first elements of the magnetic retaining means comprising in the one case a thin ferromagnetic sheet of material and in the other case a polarized permanent magnet, underlying the thin-sheet non-magnetic spacer and protective top layer of the tray means.

FIG. 5 is a fragmentary view, partly in section and partly in elevation, taken in the direction of the arrows 4—4 of FIG. 5 and with the central portion of the tray broken away for drawing space conservation reasons.

FIG. 6 is a bottom plan view of the tray means with all of the drawer means in completely closed relationship and with the leg means in collapsed and positively retained relationship under the bottom surface of the tray means. In other words, in this view the various movable parts of the apparatus are in the relative positions shown in FIG. 2, although FIG. 6 is, of course, as pointed out above, a plan view of the apparatus as seen from the bottom thereof, rather than a front upper perspective view like FIG. 2. This view is drawn to a larger scale than FIG. 2 and to a smaller size than FIGS. 4 and 5.

FIG. 7 is a very much larger-scale fragmentary view taken in the direction of the arrows 7—7 of FIG. 6, with the tray means positioned in its conventional horizontal orientation and with the leg means in effectively erected relationship in the manner shown in FIGS. 1, 4, and 5, and clearly illustrates the structure of one exemplary form of controllably extendable leg means consisting of telescopic portions and means for locking them in various extended and/or retracted relationships. It should be understood that this showing of this particular extendable leg means and the means for locking the relatively extendable and retractable leg portions in various extended and/or retracted relationships is exemplary of the other three leg means also and, therefore, their corresponding structures need not be individually shown.

FIG. 8 is a larger-scale fragmentary view taken in the direction of the arrows 8—8 of FIG. 7 and illustrates the exemplary locking means in even greater detail.

FIG. 9 is another perspective view somewhat like FIG. 4 but seen from the opposite corner thereof and with the leg means broken away for space conservation reasons and with the drawer means in fully retracted relationship. This view also shows the tray means as being removably provided with book rest means at a substantially central location opposite the portion of the tray where a user's body is adapted to be positioned, said book rest means being of a hinged fold-down type and also being provided with mounting means for ready engagement and disengagement with respect to the tray means. This view also shows a different type of magnetic retention of an article with respect to the tray means at the left corner of the tray means, this type of magnetic retention being the reverse of that provided by the central portions of the tray—that is, this particular magnetic retention is provided by polarized magnet means carried underneath the top surface of the tray and cooperable with a ferromagnetic bottom portion of the article, which is shown as comprising a typical can such as is adapted to carry various fruit juices, and other ingestible liquids. Such cans conventionally are made out of thin sheet steel (which is a ferromagnetic material (covered with a very thin plating of tin to protect against corrosion of the steel. This view also shows the mounting of a lamp in one manner by mechanical retaining cooperation of the base thereof with respect to one of the handle means, it being understood that said lamp base may comprise one element of a two-element magnetic retaining means cooperable with the other element thereof carried by the tray means for magnetic retention, if desired.

FIG. 10 is a fragmentary view taken in the direction of the arrows 10—10 of FIG. 9 and illustrates the position of the fold-down hinge means of the book rest means.

FIG. 11 is an enlarged fragmentary view taken in the direction of the arrows 11—11 of FIG. 10 and illustrates one of the two identical slidable insert members carried by the book rest means and cooperable with one of the two identical slide receivers carried underneath the tray means and which, together, effectively comprise removable mounting means for controllably removably mounting the book rest means in the relationship best shown in FIG. 9.

FIG. 12 is a bottom plan view of the lamp means of FIG. 9 showing the first element portion of the magnetic means carried thereby, the second element portion being carried by the tray adjacent to and underlying the top surface thereof as is best shown in the broken away parts thereof illustrated in FIG. 4.

FIG. 13 is an enlarged fragmentary view, partly in elevation and partly in section, taken in the direction of the arrows 13—13 of FIG. 9 and clearly illustrates the magnetically retained relationship of the ferromagnetic can relative to the permanent magnet means carried by the tray under the top surface thereof at said location and also at the other opposite and most remote corner of the tray as seen in FIG. 9. This view also shows the downwardly directed circular groove means carried by the top surface of the tray at each of said locations and the receiving relationship thereof with respect to the similarly downwardly directed circular rim means of the ferromagnetic can.

FIG. 14 is an enlarged fragmentary sectional view of a different type of article, which is of a liquid-containing receptacle form comprising a cup as shown in FIG. 16, and is taken in the direction of the arrows 14—14 of FIG. 16. This view clearly shows the other type of magnetic retaining arrangement wherein the permanent magnet means is carried by the base of the article or receptacle and the ferromagnetic material is carried underneath the top surface of the tray.

FIG. 15 is a view very similar to FIG. 14, but merely illustrates a different type of article which is also of the receptacle type but which, in this case, is shown as comprising what is commonly termed a "glass," although it need not be made of glass but merely comprises a symmetrical drinking receptacle having no handle in the manner of the cup shown in FIG. 14. It may be made of any material.

FIG. 16 is a fragmentary perspective view, generally similar to the right portion of FIG. 9, but shows three different types of articles in magnetically retained relationship with respect to the top surface of the tray. The most remote one of said articles shown adjacent to the remote far corner of the tray in this view comprises an ash tray of the type better shown in FIG. 17 wherein the base of the ash tray carries a piece of ferromagnetic material which is magnetically attracted to the permanent magnet mounted below the top surface of the tray. In other words, this type of magnetic retention is similar to that illustrated in FIG. 13, although it may be of the type shown in FIGS. 14 and 15, in certain forms of the invention. This view also shows the mounting of the cup of FIG. 14 in the other magnetic retention manner wherein the bottom of the cup carries permanent magnet means magnetically attractively cooperable with the ferromagnetic sheet of material carried underneath the top surface of the tray as is best shown in FIG. 14. This view also shows a larger dish in magnetically retained relationship with respect to the top of the tray, wherein the magnetic retention arrangement is of the same type as shown in FIGS. 14 and 15 but includes two permanent magnets carried by the bottom of the large dish or receptacle and magnetically attractively cooperable with respect to the ferromagnetic sheet carried underneath the top surface of the tray as is best shown in FIG. 17.

Figure 12:
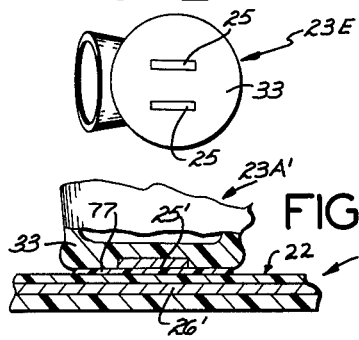

Generally speaking, one exemplary form of the invention is shown in the figures as comprising a tray means, indicated generally by the reference numeral 21. The tray means 21 of said exemplary form of the invention is shown as having a substantially horizontally directed flat or planar table or platform means or portion, indicated generally at 22, carried across the top thereof and adapted to receive and support bottom surfaces of any of a plurality of interchangeable articles, as indicated at 23 in FIGS. 9 and 13, 23A in FIGS. 14 and 16, 23A' in FIG. 19, 23B in FIG. 15, 23C in FIGS. 16 and 17, 23D in FIGS. 16 and 17, and 23E in FIGS. 9 and 12. Of course, these articles are exemplary only and are not to be construed as specifically limiting the invention to these specific articles only.

Any one of the articles 23, 23A, 23B, 23C, 23D, 23E, and 23A' and the corresponding portion of the upper surface of the table or platform means or portion 22 of the top of the tray means 21 are effectively provided with two-element magnetic retaining means, with one of said elements being carried by a base portion of said article and the other of said elements being carried underneath the top surface of the tray means 22.

Figure 13:
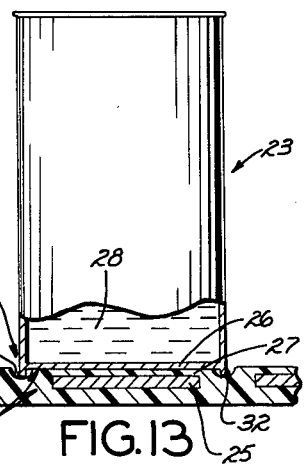

One exemplary form of said magnetic retaining means is generally designated by the reference numeral 24 in FIG. 13 and comprises an arrangement wherein the one of said two-element magnetic retaining means 24 which is carried underneath the top surface of the table or platform portion 22 of the tray means 21 comprises a polarized permanent magnet 25, and wherein the other element of said two-element magnetic retaining means 24 is a ferromagnetic member 26 which comprises the bottom of the ferromagnetic liquid-containing can 23. It will be noted that this type of can is that conventionally employed for supplying various liquids for human consumption and the arrangement is such as to very firmly and positively mount the can 23 in the position shown in FIGS. 9 and 13.

It should also be noted that the two elements 25 and 26 of the two-element magnetic retaining means 24 are effectively provided with non-magnetic spacer means 27 lying therebetween. This is shown, in the example illustrated in FIGS. 9 and 13, as comprising a relatively thin layer or sheet of plastic material overlying the remainder of the plastic material of which the table or platform 22 of the tray means 22 is formed and with the permanent magnet 25 being effectively imbedded within said plastic material and underlying said plastic spacer 27. This acts to prevent direct contact of the two elements 25 and 26 of the magnetic retaining means 24 and, therefore, does not allow the existence of the extremely strong magnetic attractive force which occurs when two such magnetic elements are in direct contact and which would probably require the application of so much manual force in order to separate same as to possibly cause the spilling of the liquid 28 from within the can 23 when opened at the top, as indicated at 29 in FIG. 9. This is also true, to an even greater degree, of other types of containers having completely open tops.

It should be noted that, in the specific form of the magnetic retaining means 24 illustrated in FIG. 13, the particular portion (or portions) of the upper surface of the platform 22 of the tray means 21 having such a permanent magnet 25 imbedded thereunder are indicated at 30 and are provided with downwardly directed substantially circular or annular groove means, as indicated at 31, receivingly cooperable with respect to the corresponding downwardly directed circular rim means 32 carried by the bottom of the can 23. Of course, such a circular groove 31 would not be necessary in the case of substantially rimless cans, such as the type is which evaporated milk is conventionally supplied.

Figure 20:
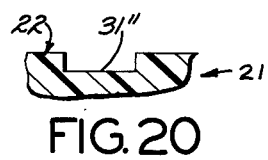
FIG. 20 is an enlarged fragmentary view illustrating a slight modification of the circular or annular groove means best shown in FIG. 13.

In order to provide for the receiving cooperation of the groove 31 with a number of different sizes of cans, said groove 31 may be made of substantial radial width to any desired annular extent. This is indicated fragmentarily in FIG. 20 wherein the groove in indicated by the reference numeral 31″ and is carried by a similar portion of the platform 22 but is of substantially greater width than the form shown in FIGS. 9 and 13.

It is should be noted that in the exemplary form of the invention illustrated, two such grooves 31 are carried by corresponding remote corner portions of the platform means 22. However, they may be positioned at various locations, as desired.

Figure 16:
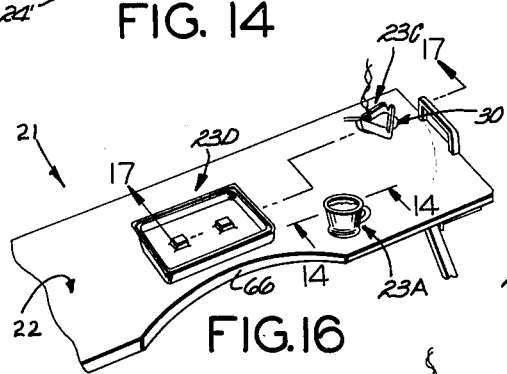
Figure 17:
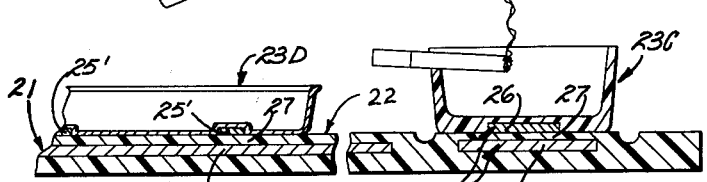
FIG. 17 is an enlarged fragmentary sectional view taken in the direction of the arrows 17—17 of FIG. 16.

It should be noted that the article means 23C shown in FIGS. 16 and 17 includes two-element magnetic retaining means similar to that shown in FIG. 13 and, therefore, is designated by the same reference numeral 24. In other words, the ash tray 23C carries at the bottom thereof a ferromagnetic member 26 which is adapted to be attracted to the permanent magnet 25 imbedded beneath the top surface of the platform 22 of the tray 21 with the non-magnetic spacer 27 being interposed therebetween. Thus, the ash tray 23C is adapted to be magnetically mounted with respect to the tray 21 at the same locaions as those indicated generally at 30 and previously described as suitable for the mounting of the can 23 shown in FIGS. 9 and 13.

Figure 14:
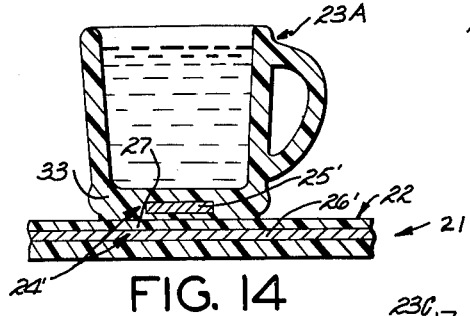

The remainder of the magnetic retaining means adapted to magnetically retainingly mount the remainder of the articles designated by the reference characters 23A (shown in FIGS. 14 and 16), 23B (shown in FIG. 15), 23D (shown in FIGS. 16 and 17), and 23E (shown in FIGS. 9 and 12), with respect to the upper surface of the platform means 22 of the tray means 21 are of the other type, as exemplified by the showing of FIG. 14 wherein said magnetic retaining means is designated by the reference numeral 24'. In this view the article 23A, which is shown as comprising a cup adapted to contain liquid, carries the permanent magnet means 25' adjacent to the base 33 thereof, while the platform member 22 of the tray means 21 carries the ferromagnetic thin-sheet member 26' underneath the non-magnetic spacer member 27. Thus, the container 23A will be magnetically retained and firmly mounted in a manner analogous to the mounting of the can 23 of FIGS. 9 and 13 and/or the mounting of the ash tray 23C of FIGS. 16 and 17 with respect to the platform means 22, of the tray 21.

It should be noted that all of the article means designated by the reference characters 23B, 23D, and 23E have magnetic retaining means similar to that illustrated in FIG. 14 and just described in detail. Therefore, the magnetic retaining means of each of said articles is designated by the same reference numeral 24' and the parts thereof bear similar reference numerals to those shown in FIG. 14 and it is believed that detailed description of each of said identical magnetic retaining means 24' with respect to each of said articles would be redundant and superfluous and, therefore, no such repeated detailed description is included herein.

Figure 15:
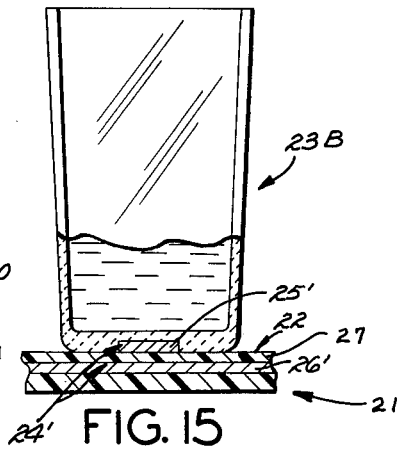

However, for purposes of clarification in connection with the above, it should be noted that the article 23B illustrated in FIG. 15 is shown, for exemplary purposes, as comprising a different type of liquid-containing receptacle of the type conventionally referred to as a "drinking glass" although it may be made of any suitable material.

Also, for clarification purposes it should be noted that the article 23D shown in FIGS. 16 and 17 comprises a different type of receptacle which takes the form of an edge-flanged dish in which one's food for a meal may be placed and, in this particular form of the article, there are multiple permanent magnets 25 carried by the bottom of the receptacle 23D and magnetically attractively cooperable with respect to the ferromagnetic sheet 26' carried beneah the non-magnetic spacer element 27 comprising the top surface of the platform means 22 of the tray 21.

Also, it should be noted that the above-mentioned article 23E, as shown in FIGS. 9 and 12, takes a slightly different form wherein it comprises a lamp, and wherein the base portion 33 thereof comprises a lamp base having two of the permanent magnets 25 adapted to the magnetically attractively cooperable with the thin-sheet ferromagnetic member 26' in precisely the same manner as the cooperation of the twin magnets 25 carried by the dish type receptacle 23D shown in FIG. 17.

In the specific form of the invention illustrated, the tray means 21 is provided thereunder with leg means, indicated generally at 34, and hinge means, indicated generally at 35, hingedly mounting the leg means 34 with respect to the bottom of the tray means 21 for controllable effective erection of the leg means 34 into a downwardly extended relationship as clearly shown in FIGS. 1, 4, 5, 7, 8, and 9 and for effective collapsing of same when desired into a substantially planar relationship lying immediately under the tray means 21 in a position such as is clearly shown in FIGS. 2, 3, and 6.

In the specific example illustrated, there are four of the legs 34 having upper ends hingedly mounted by four of the hinge means 35 which are fastened by appropriate bracket means 36 and fastener means 37 to the bottom surface 38 of the tray means 21 at locations substantially corresponding to the four corners of a rectangle, although not specifically so limited.

Each of said hinge means 35 includes an effective pivot pin 39 so inclined as to cause the remote or free end 41 of the corresponding leg to move into a position adjacent to the center of the tray means immediately underneath the bottom surface 38 thereof, as is best shown in FIG. 6, when fully effectively collapsed. This makes it possible for a very simple type of retaining means, indicated generaly at 42, to be manually operated for controllably retaining all four of the leg means 34 in said fully collapsed relationship, or either the front two thereof or the back two thereof, in the event that such is desired for supporting the tray means 21 with respect to an inclined or stepped underlying supporting surface.

In the specific example illustrated the leg retaining means 42 comprises two rotary wing members 43 mounted on pivot posts 44 so that they can be rotated from non-retaining positions, such as is shown in the case of the right member 43 in phantom in FIG. 6, in the direction of the arrow 45 (or for that matter in the opposite direction) into the relationship shown in solid lines in FIG. 6 where each of said members 43 extends across the width direction of the tray so as to abut the underneath surface of each of the ends 41 of the legs 34. However, various other types of leg-mounting and/or leg-retaining means may be employed within the broad scope of the present invention.

In the specific form of the invention illustrated, each of the leg means 34 is of a controllably extendable type and includes controllably extendable portions 34A and 34B which are telescopically engaged with each other, and also includes means, indicated generally at 45, for locking them in various extended and/or retracted relationships. These features are best shown in FIGS. 7 and 8, wherein the exemplary locking means 45 is shown as comprising a manually operable lever 46 pivoted on a pivot shaft 47 connected across a bifurcated yoke portion 48 carried by the upper leg portion 34A on each side of slots, said locking means 45 also including a forward locking dog or catch portion 49 adapted to cooperate with corresponding recessed portions 51 carried along the inside of the extendable leg portion 34B. The lever means 46 is spring biased by the spring means 52 into the solid line position shown in FIGS. 7 and 8 where the locking dog or catch 49 normally lies in any one of the recessed portions 51 whereby to positively lock the two leg portions 34A and 34B against shortening or retracting relative movement thereof while allowing controllable relative extending movement thereof such as is indicated in broken lines in FIG. 7. This type of extending movement can be accomplished without the necessity of operating the lever means 46.

However, the oppositely directed retraction movement cannot be accomplished until the lever means 46 is manually operated into the unlocked relationship shown in broken lines in FIG. 8.

It should be clearly understood that this type of extendable and retractable leg means and locking means therefor is exemplary only and is not intended to specifically limit the invention thereto.

It should be noted that the arrangement of the leg means 34 and the hinge means 35 is such that the extended leg means 34 may be employed for supporting the tray means 21 on a bed or the like such as that shown at 53 in FIG. 1, or any other horizontal surface, or the leg means 34 may be completely collapsed and placed in the retained relationship shown in FIG. 6 so that the tray means 21 may rest upon the arms 54 of a chair, such as that generally indicated at 55 in FIG. 2, or any other equivalent transversely spaced auxiliary support members functionally similar to the arms 54. One such arrangement is shown in FIG. 3 wherein the laterally spaced top edge portions 54' of a bathtub, indicated generally at 56, comprise functional equivalents to the chair arms 54 and provide a firm stable support for the tray 21.

It should be noted that in both FIG. 2 and FIG. 3, the downwardly projecting positioning members 57 may provide additional stability and positioning control of the tray means 21 by reason of their downward extension into guiding abutting contact with inner surface parts 58 of the upwardly extended portions 54' of the bathtub 56 (it being understood that similar cooperation of the downwardly projecting positioning members 57 may occur with respect to similarly positioned inner parts of the upwardly extended side arm portions 54 of the chair 55 of FIG. 2).

The specific exemplary form of the invention illustrated may be provided with book rest means, as indicated generally at 59 in FIGS. 9 and 10 if desired. Said book rest means 59 may be controllably removably mountable with respect to the tray means 21 so as to be capable of being positioned relative to the tray means 21 in the manner shown in FIGS. 9 and 10.

In the arrangement shown in FIGS. 9 and 10, said book rest means 59 comprises an upstanding panel portion 61 having horizontally directed hinge means 62 connected to a lower portion 63 which carries a pair of laterally spaced projecting insert members 64 which are adapted to be slidably inserted into correspondingly spaced slide receivers 65 mounted underneath the bottom surface 38 of the tray means 21 opposite the curved cut-out portion 66 which is adapted to be positioned adjacent to a user's body. In other words, the slide receivers 65 are positioned at a central location on the opposite side of the tray 21 from the seated position of a user of the tray. This is clearly shown in both FIGS. 1 and 2.

Thus, the upstanding panel portion 61 of the book rest 59 will be positioned in an angularly inclined relationship suitable for the mounting thereon of a book, as indicated in phantom at 67 in FIG. 9. Various means for holding the book 67 open at a selected place may be employed in accordance with conventional prior art practice in this connection and such are not described since they are well known in the art.

The hinge means 62 lies at a level just above the top surface of the platform means 22 of the tray 21 so that the upper panel portion 61 of the book rest 59 can be folded down into a position directly overlying said upper surface of the tray 21 as is clearly shown in phantom in FIG. 10. This provides an arrangement which makes it possible to readily carry or store the entire device with the book rest still mounted on the tray, although in the folded down position. On the other hand, the book rest 59 may be removed entirely from the tray by merely slidably disengaging the slidable insert members 64 from the corresponding slide receivers 65.

Figure 18:
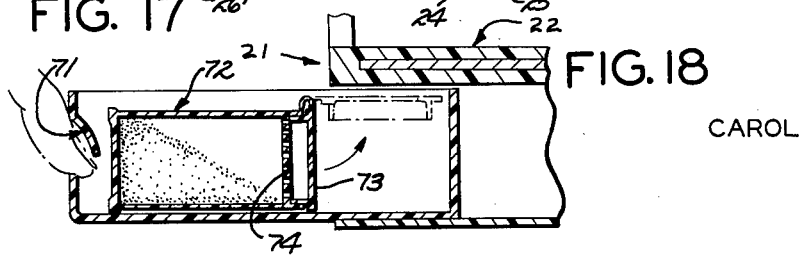
FIG. 18 is an enlarged fragmentary sectional view taken in the direction of the arrows 18—18 of FIG. 4 and clearly illustrates one of the end-mounted drawer means, it being understood that the other one is identical although positionally reversed and that the front-mounted drawer means is similar in principle.

The tray means 21 may be provided with a plurality of end and/or edge mounted drawer means, as indicated generally at 68 in the case of the pair of end-mounted drawer means and as indicated generally at 69 in the case of the front or remote edge-mounted drawer means. Each of these drawers is slidably mounted underneath the platform means 22 of the tray means for controllable movement between closed positions underlying same and open positions extending outwardly from same in the manner best shown in FIG. 4 as a result of digital engagement of the effective non-projecting handle means, indicated generally at 71, as best shown in detail in FIG. 18. These drawer means may carry therein suitable accessory or auxiliary items customarily employed when eating, such as salt and pepper shakers or the like, a typical one of which is indicated at 72 in FIG. 18 and which includes a resilient closure cap 73 which can be forcibly opened and closed with respect to the apertured dispensing head 74, as desired. However, this is illustrative only and various other articles may be carried within any of the drawer means 68 and 69.

The tray means 21, in the specific form of the invention illustrated, is shown as being provided with handle means 75 which comprises two upstanding, substantially rectangular handles mounted flush with the corresponding rectangular end edges 76 of the platform means 22 of the tray means 21, thus providing an arrangement which facilitates the standing on end of the tray means when in a stored non-use position. It will be noted that this is also facilitated by reason of the fact that the flush end-mounted drawer means 68 have the non-projecting handle means 71 which do not in any way interfere with such standing on end of the complete device when it is to be stored away during non-use periods.

Figure 19:
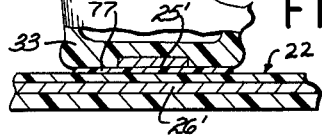
FIG. 19 is a fragmentary partially sectional view similar to the bottom portion of FIG. 14, but illustrating a slight modification thereof.

FIG. 19 is a fragmentary view which merely illustrates a very slight modification of the bottom of the article means 23A of FIG. 14 which is designated by the reference numeral 23A' in this view, with all other parts being designated by the same reference numerals as in FIG. 14. In this view the only difference is the provision of an extra non-magnetic thin sheet of material indicated by the reference numeral 77 in lieu of the portion of the bottom 33 shown in FIG. 14 as lying below the permanent magnet 25'. In other words, in this modification, the permanent magnet 25' is flush-mounted with respect to the bottom surface of the bottom portion 33' of the container 23A and the auxiliary thin sheet of non-magnetic material 77 is then cemented or otherwise suitably affixed underneath the permanent magnet 25'. This type of construction may be employed in any of the other articles in lieu of the specific constructions thereof shown in the figures and described in detail hereinafter.

While, in one preferred form of the invention, the platform means 22 of the tray means 21 is preferably made of molded plastic construction, as are most of the articles adapted to be magnetically retained thereon, it should be clearly noted that the invention is not specifically so limited, and the tray means and/or the various article means may be made of various suitable materials.

It should be noted that the various articles designated in common by the reference numeral 23 and various letters of the alphabet following same corresponding to the particular modification of the invention illustrated and described, are exemplary only and are not to be construed as specifically limiting the invention to the particular articles specifically illustrated and described. Actually, a great variety of different types of articles may be magnetically cooperably retainable with respect to the tray means 21. One additional such article, which is to be construed as exemplary of the many different articles which may cooperate with the tray means 21, is designated by the reference numeral 23F in FIG. 9 and is shown as comprising a conventional type of clip-board having a rectangular rigid backing member 78 and spring clip means 79 at the top thereof which is controllably and forcibly operable from its normally closed relationship into an open relationship in order to initially receive one or more sheets of paper, such as shown at 81 in FIG. 9, whereby to rigidly back up and mount said paper 81 in a manner which provides a firm foundation for writing thereon by any suitable writing instrument, such as the one indicated at 82 in FIG. 9 or any other substantial equivalent thereof.

It should be noted that, in certain forms of the invention, the clip-board 23F may be provided with appropriate means for receiving and mounting the writing instrument 82 during non-use periods. However, this is optional and the present invention is not concerned with this feature.

The rear surface of the rigid backing member 78 is adapted to be provided with one or more permanent magnets 25' similar to those described hereinbefore in connection with the forms of the invention wherein the article means are designated by the reference numerals 23Z, 23B, 23D, and 23E. Indeed, in the particular arrangement illustrated in FIG. 9, the rigid backing member 78 is provided with two such permanent magnets 25', indicated in broken lines, corresponding substantially to the disclosure of the two permanent magnets 25' of the large dish or receptacle 23D illustrated in FIGS. 16 and 17. However, any desired number of permanent magnets 25' may be employed.

It should be clearly noted that the container or receptacle 23C shown in FIGS. 16 and 17 as comprising an ash tray may, in certain preferred forms of the invention, have the other type of magnetic retaining means, such as the type illustrated in FIGS. 14 and 15, for example, wherein the permanent magnet 25' is carried within the base of the ash tray 23C for cooperation with the thin ferromagnetic sheet 26', which is carried below the top surface of a very large area of the tray 21—in fact, in one preferred form said thin sheet ferromagnetic member 26' is coextensive with substantially the entire area of the top surface of said tray 21 exclusive of the corner cutouts for the other type of magnetic retaining means, as clearly shown in the broken-away near corner portion of the top surface of the tray illustrated in FIG. 4. This alteration of the type of magnetic retaining means will allow the ash tray 23C to be retained at virtually any desired location over the entire surface of the tray 21 by said modified type of magnetic retaining action. Indeed, it can even be retained over the two corner portions indicated at 30 of the tray 21 since the magnet carried by the bottom of the ash tray 23C and the magnet positioned underneath the top surface of the tray 21 in the region indicated by the reference numeral 30 may be oppositely polarized so as to cause a very effective magnetic retaining action to occur under such conditions.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Platform means and magnetically cooperably retainable article means, comprising: a platform having a substantially horizontally directed top surface portion; at least one article adapted to be magnetically cooperably retained in upstanding supported relationship on said top surface portion of said platform; two-element magnetic retaining means for effectively magnetically retaining said article in said upstanding supported relationship on said top surface portion of said platform, said two-element magnetic retaining means comprising a first magnetic means adjacent to said top surface portion of said platform and second magnetic means carried adjacent to the bottom of said article, said first and second magnetic means being magnetically attractively cooperable whereby to firmly retain said article in said upstanding supported relationship on said top surface portion of said platform in a manner inhibiting the likelihood of accidental and inadvertent dislodgement thereof until a slight amount of force is manually applied thereto for removal of said article from said top surface portion of said platform; said first magnetic means comprising a thin sheet of ferromagnetic material coextensive with a substantial area of said top surface portion of said platform exclusive of certain predetermined corner portions thereof, said second magnetic means comprising polarized permanent magnet means carried by a base portion of said controllably removably and magnetically cooperably retainable article.

2. Apparatus as defined in claim 1, including non-magnetic spacer means effectively interposed between said first and second magnetic means of said magnetic retaining means.

3. Apparatus as defined in claim 1, including non-magnetic spacer means lying immediately over said first magnetic means and effectively comprising a part of said top surface portion of said platform.

4. Apparatus as defined in claim 1, including non-magnetic spacer means lying immediately below said second magnetic means of said magnetic retaining means.

5. Apparatus as defined in claim 1, including non-magnetic spacer means lying immediately below said second magnetic means of said magnetic retaining means and comprising a bottom surface portion of said article.

6. Platform means and magnetically cooperably retainable article means, comprising: a platform having a substantially horizontally directed top surface portion; at least one article adapted to be magnetically cooperably retained in upstanding supported relationship on said top surface portion of said platform; two-element magnetic retaining means for effectively magnetically retaining said article in said upstanding supported relationship on said top surface portion of said platform, said two-element magnetic retaining means comprising a first magnetic means adjacent to said top surface portion of said platform and second magnetic means carried adjacent to the bottom of said article, said first and second magnetic means being magnetically attractively cooperable whereby to firmly retain said article in said upstanding supported relationship on said top surface portion of said platform in a manner inhibiting the likelihood of accidental and inadvertent dislodgement thereof until a slight amount of force is manually applied thereto for removal of said article from said top surface portion of said platform; said first magnetic means comprising polarized permanent magnet means coextensive with at least one particular limited area part of said top surface portion of said platform.

7. Platform means and magnetically cooperably retainable article means, comprising: a platform having a substantially horizontally directed top surface portion; at least one article adapted to be magnetically cooperably retained in upstanding supported relationship on said top surface portion of said platform; two-element magnetic retaining means for effectively magnetically retaining said article in said upstanding supported relationship on said top surface portion of said platform, said two-element magnetic retaining means comprising a first magnetic means adjacent to said top surface portion of said platform and second magnetic means carried adjacent to the bottom of said article, and first and second magnetic means being magnetically attractively cooperable whereby to firmly retain said article in said upstanding supported relationship on said top surface portion of said platform in a manner inhibiting the likelihood of accidental and inadvertent dislodgment thereof until a slight amount of force is manually applied thereto for removal of said article from said top surface portion of said platform; said first magnetic means comprising polarized permanent magnet means coextensive with at least one particular limited area part of said top surface portion of said platform exclusive of the major area part of said top surface portion of said platform.

8. Platform means and magnetically cooperably retainable article means, comprising: a platform having a substantially horizontally directed top surface portion; at least one article adapted to be magnetically cooperably retained in upstanding supported relationship on said top surface portion of said platform; two-element magnetic retaining means for effectively magnetically retaining said article in said upstanding supported relationship on said top surface portion of said platform, said two-element magnetic retaining means comprising a first magnetic means adjacent to said top surface portion of said platform and second magnetic means carried adjacent to the bottom of said article, said first and second magnetic means being magnetically attractively cooperable whereby to firmly retain said article in said upstanding supported relationship on said top surface portion of said platform in a manner inhibiting the likelihood of accidental and inadvertent dislodgment thereof until a slight amount of force is manually applied thereto for removal of said article from said top surface portion of said platform; said first magnetic means comprising polarized permanent magnet means coextensive with at least one particular limited area part of said top surface portion of said platform, said second magnetic means comprising ferromagnetic material carried by a base portion of said controllably removably and magnetically cooperably retainable article.

9. Platform means and magnetically cooperably retainable article means, comprising: a platform having a substantially horizontally directed top surface portion; at least one article adapted to be magnetically cooperably retained in upstanding supported relationship on said top surface portion of said platform; two-element magnetic retaining means for effectively magnetically retaining said article in said upstanding supported relationship on said top surface portion of said platform, said two-element magnetic retaining means comprising a first magnetic means adjacent to said top surface portion of said platform and second magnetic means carried adjacent to the bottom of said article, said first and second magnetic means being magnetically attractively cooperable whereby to firmly retain said article in said upstanding supported relationship on said top surface portion of said platform in a manner inhibiting the likelihood of accidental and inadvertent dislodgment thereof until a slight amount of force is manually applied thereto for removal of said article from said top surface portion of said platform; said first magnetic means comprising polarized permanent magnet means coextensive with at least one particular limited area part of said top surface portion of said platform exclusive of the major area part of said top surface portion of said platform, said second magnetic means comprising ferromagnetic material carried by a base portion of said controllably removably and magnetically cooperably retainable article.

10. Platform means and magnetically cooperably retainable article means, comprising: a platform having a substantially horizontally directed top surface portion; at least one article adapted to be magnetically cooperably retained in upstanding supported relationship on said top surface portion of said platform; two-element magnetic retaining means for effectively magnetically retaining said article in said upstanding supported relationship on said top surface portion of said platform, said two-element magnetic retaining means comprising a first magnetic means adjacent to said top surface portion of said platform and second magnetic means carried adjacent to the bottom of said article, said first and second magnetic means being magnetically attractively cooperable whereby to firmly retain said article in said upstanding supported relationship on said top surface portion of said platform in a manner inhibiting the likelihood of accidental and inadvertent dislodgment thereof until a slight amount of force is manually applied thereto for removal of said article from said top surface portion of said platform; said first magnetic means comprising polarized permanent magnet means coextensive with at least one particular limited area part of said top surface portion of said platform exclusive of the major area part of said top surface portion of said platform, said second magnetic means comprising ferromagnetic material carried by a base portion of said controllably removably and magnetically cooperably retainable article, said article having a transversely directed disc-shaped thin-sheet bottom portion effectively comprising said ferromagnetic material and having a downwardly directed circular rim means extending below the level of said transversely directed bottom portion, said limited area part of said top surface portion of said platform immediately above and symmetrically circularly disposed with respect to said underlying permanent magnet means being provided with downwardly directed annular groove means for receiving cooperation with respect to said downwardly directed circular rim means carried by the bottom of said article.

11. Apparatus as defined in claim 1, wherein said article comprises upwardly effectively concave receptacle and container means adapted to receive, contain, and carry desired material therein.

12. Apparatus as defined in claim 1, including a plurality of said articles, each adapted to be magnetically cooperably retained in upstanding supported relationship on said top surface portion of said platform, said second magnetic means comprising a plurality of second magnetic means portions, with one such portion being carried by each of said plurality of articles and being magnetically retainingly cooperable with respect to said first magnetic means adjacent to said top surface portion of said platform.

13. Apparatus as defined in claim 12, wherein the second magnetic means portion carried by certain of said articles comprises polarized permanent magnet means carried adjacent to corresponding base portions of said articles, with the corresponding first magnetic means carried by said platform and cooperable therewith comprising a thin sheet of ferromagnetic material coextensive with a substantial area of said top surface portion of said platform exclusive of certain predetermined portions thereof, the second magnetic means portions of at least one of said articles comprising a thin sheet of ferromagnetic material carried at the bottom thereof, with said first magnetic means carried by said platform and magnetically retainingly cooperable therewith comprising polarized permanent magnet means carried by and coextensive with and below a limited area part of said top surface portion of said platform in at least one of said predetermined portions thereof.

References Cited in the file of this patent

UNITED STATES PATENTS

| | | |
|---|---|---|
| 425,768 | Ezell | Apr. 15, 1890 |
| 744,888 | Widman | Nov. 24, 1903 |
| 1,006,834 | Edwards | Oct. 24, 1911 |
| 2,217,514 | Henry | Oct. 8, 1940 |
| 2,431,827 | Rado | Dec. 2, 1947 |
| 2,642,999 | McPherson | June 23, 1953 |
| 2,650,442 | Johnson | Sept. 1, 1953 |
| 2,849,984 | Eisenmenger | Sept. 2, 1958 |
| 3,013,688 | Luning | Dec. 19, 1961 |

FOREIGN PATENTS

| | | |
|---|---|---|
| 304,874 | Great Britain | Jan. 31, 1929 |